US010645784B1

(12) United States Patent
Lu et al.

(10) Patent No.: US 10,645,784 B1
(45) Date of Patent: May 5, 2020

(54) ELECTRIC LEAKAGE PROTECTION ELECTRONIC RECTIFIER AND LAMP WITH ELECTRIC LEAKAGE PROTECTION ELECTRONIC RECTIFIER

(71) Applicant: Xiamen PVTECH Co., Ltd., Xiamen, Fujian (CN)

(72) Inventors: Fuxing Lu, Fujian (CN); Rongtu Liu, Fujian (CN)

(73) Assignee: Xiamen PVTECH Co., Ltd., Xiamen, Fujian (CN)

( * ) Notice: Subject to any disclaimer, the term of this patent is extended or adjusted under 35 U.S.C. 154(b) by 0 days.

(21) Appl. No.: 16/512,313

(22) Filed: Jul. 15, 2019

(30) Foreign Application Priority Data

Mar. 22, 2019 (CN) .......................... 2019 1 0222172

(51) Int. Cl.
*H05B 37/02* (2006.01)
*H05B 45/50* (2020.01)
*H02M 7/217* (2006.01)
*H02H 9/02* (2006.01)

(52) U.S. Cl.
CPC .............. *H05B 45/50* (2020.01); *H02H 9/02* (2013.01); *H02M 7/217* (2013.01)

(58) Field of Classification Search
CPC .. H05B 41/28; H05B 41/295; H05B 41/2827; H05B 41/3925; H05B 41/2928; H05B 41/2806; H05B 33/0815; H05B 33/0818; H05B 41/2828; H05B 41/3921; H05B 41/3927; H05B 37/029; H05B 33/0803; H05B 37/0254; H05B 37/02; Y02B 20/202; Y02B 20/208; H01J 65/046; H01J 61/827
See application file for complete search history.

(56) References Cited

U.S. PATENT DOCUMENTS

| 2016/0276824 | A1* | 9/2016 | Shin | H02H 3/16 |
| 2017/0105265 | A1* | 4/2017 | Sadwick | A61N 5/0618 |
| 2017/0311396 | A1* | 10/2017 | Sadwick | F21V 25/00 |
| 2018/0279442 | A1* | 9/2018 | Deng | H05B 33/0887 |

* cited by examiner

*Primary Examiner* — Minh D A
(74) *Attorney, Agent, or Firm* — Winston Hsu

(57) ABSTRACT

The invention discloses an electric leakage protection electronic rectifier and a lamp with an electric leakage protection electronic rectifier. The electric leakage protection electronic rectifier including a leakage detecting module and a driving module. The driving module has a current-limiting control unit. The current-limiting control unit is electrically connected between the leakage detecting module and a lamp's light-emitting module. When used, the leakage detecting module detects whether power supply is leaked, and the current-limiting control unit limits the output current to avoid the current output exceeding the tolerable range of the lamp. Such that the invention prolongs the service life of lamps and prevents a current leakage from the lamp.

9 Claims, 4 Drawing Sheets

ELECTRIC LEAKAGE PROTECTION ELECTRONIC RECTIFIER AND LAMP WITH ELECTRIC LEAKAGE PROTECTION ELECTRONIC RECTIFIER

BACKGROUND OF THE INVENTION

1. Field of the Invention

The invention relates to an electronic rectifier and a lamp, in particular to an electric leakage protection electronic rectifier and a lamp with the electric leakage protection electronic rectifier.

2. Description of the Prior Art

Conventional LED tubes on the market do not include any fuse device. When the voltage at the lamp base is not stable, ignition is easily generated under a poor contact situation. Then, the position of the contact point has an arc-drawing high temperature. The LED is easily burnt out. When the first LED in the series connection is burnt out, the subsequent LEDs cannot be used.

Science and technology changes with each passing day, at present the lamps on market no longer take the traditional lamp as the mainstream. Since the consumer wants the energy conservation to save the power, the LED lamps are therefore widely used.

In nowaday's technologies, LED lamps are divided into class A (Type A), class B (Type B), class C (Type C) and class A+B (Type A+B). In class A (Type A), traditional T5 and T8 fluorescent lamps can be replaced without changing the lamp structure and circuit. Type B lamp is different from Type A lamp in that the wiring inside the lamp needs to be changed during lamp installation. Class C (Type C) lamps are driven by DC power supply. Type A+B lamps are compatible with ballasts and allow direct AC power supply, so lamp replacement does not require modification of lamp structure and wiring.

But in the existing technology, A+B class (Type A+B) lamps in Type A mode output current is not constant, resulting in different ballasts are used to control current. Particularly, with the high output ballast, the output current would exceed the LED can bear. This not only affects the safety for use of the lamp, but also affects the service life of the lamp. Therefore, a better solution is indeed needed to improve safety for use of lamps class A+B (Type A+B) and prolong the service life of the lamps.

SUMMARY OF THE INVENTION

In view of the shortcomings of the above conventional technologies, the present invention mainly aims to provide an electric leakage protection electronic rectifier and a lamp with the electric leakage protection electronic rectifier, which limits the current output, avoids the current output exceeding the tolerable range of the lamp, prevents electricity leakage and prolongs the service life.

The main technical means adopted to achieve the above objective is to provide an electric leakage protection electronic rectifier, which comprises:

a leakage detecting module connecting with a power supply; and a driving module is electrically connected with the leakage detecting module, and has a current-limiting control unit electrically connected with the leakage detecting module;

the current-limiting control unit detects the output current of the power supply, when the current-limiting control unit detecting the output current of the power supply exceeding a reference signal, the current-limiting control unit limits the output current of the power supply.

In accordance with the above structure, set the leakage detecting module in a power supply end connected to the power supply, the leakage detecting module detects any leakage of the power supply.

The driving module drives a light-emitting module for lighting, and the current-limiting control unit of the driving module continued to test the power supply output current, when the current-limiting control unit detecting the output current of the power supply exceeding a reference signal, the current-limiting control unit limits the output current of the power supply to avoid the output current exceeds the range of the light-emitting module can bear. By this way, the invention achieves the goal of anti-leakage and prolongs service life of lamp as well.

Another objective of the invention to achieve is to provide a lamp, which comprises:

a body connecting with a power supply;

a leakage detecting module arranged in the body and connected with the power supply;

a light emitting module being arranged in the body;

a driving module being electrically connected with the leakage detecting module and the light emitting module respectively. The driving module has a current-limiting control unit electrically connected with the leakage detecting module.

Therewith, the current-limiting control unit detects the output current of the power supply. When the output current of the power supply exceeding a reference signal, the output current of the power supply is limited in real time.

In accordance with the above invention, in the body of the lamp, the leakage detecting module, the driving module and the light-emitting module are set. Thereby, the leakage detecting module receives the output current of the power supply, and check whether the power is leak. The driving module drives the light-emitting module for light, the current-limiting control unit of the driving module continued to test the power supply output current, when the power supply output current exceeding a reference signal, then the current-limiting control unit of the driving module limits the output current, in order to avoid the current output exceeding the tolerable range of the lamp, prevents electricity leakage and prolongs the service life.

Preferably, the driving module is a driving module with Type A+B driving circuit, and the current-limiting control unit is set under the Type A circuit of the driving module to limit the maximum current.

Preferably, the leakage detecting module comprises a rectifier connected to a power supply.

Preferably, the current-limiting control unit further comprises a voltage input unit, a filter, a reference signal sampling circuit, a comparator and a switch unit having a plurality of pins through which the filter, the reference signal sampling circuit and the switch unit are connected.

Preferably, the voltage input unit is connected with the filter and provides a voltage drop signal which is filtered by the filter and sent to the comparator; The reference signal sampling circuit provides a reference signal to the comparator as the reference signal of the current-limiting control unit.

Preferably, when the comparator receives the filtered signal from the filter and the reference signal from the reference signal sampling circuit, once the filtered signal exceeding the reference signal, the comparator outputs a control signal to the switch unit; when the switch unit is controlled, a waveform of the input voltage is lowered or partially cut off, so as to limit an output current.

Preferably, the switch unit comprises a MOS switch which is connected to a rectifier of the leakage detecting module.

Preferably, the voltage input unit comprises a first resistor and a second resistor connected together;

the filter comprises a third resistor and a first capacitor being connected together in series, and a connection portion of the third resistor and the first capacitor is connected with the comparator;

the reference signal sampling circuit comprises a fourth resistor, a fifth resistor and a sixth resistor, a diode and a second capacitor; The fourth resistor and the second capacitor are connected together in series. The fifth resistor and the diode are connected together in series. Wherein the comparator is respectively connected with a connection portion of the fourth resistor and the second capacitor, and a connection portion of the fifth resistor and the diode; and the comparator is connected with a connection portion of the fifth resistor and the sixth resistor.

Preferably, the light-emitting module refers to an LED light emitting module.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

These and other features, aspects and advantages of the invention will become better understood with regard to the following embodiments and accompanying drawings.

DETAILED DESCRIPTION

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. The components shown in figures are not used for limit the size or the proportion. The same or similar numbers denote the same or similar components. The terms "and/or" includes one or more related components, steps and so on.

The following, together with the attached drawing and a preferred embodiment of the invention, further describes the technical means adopted by the invention to achieve the intended purpose of the invention.

Figure 1:
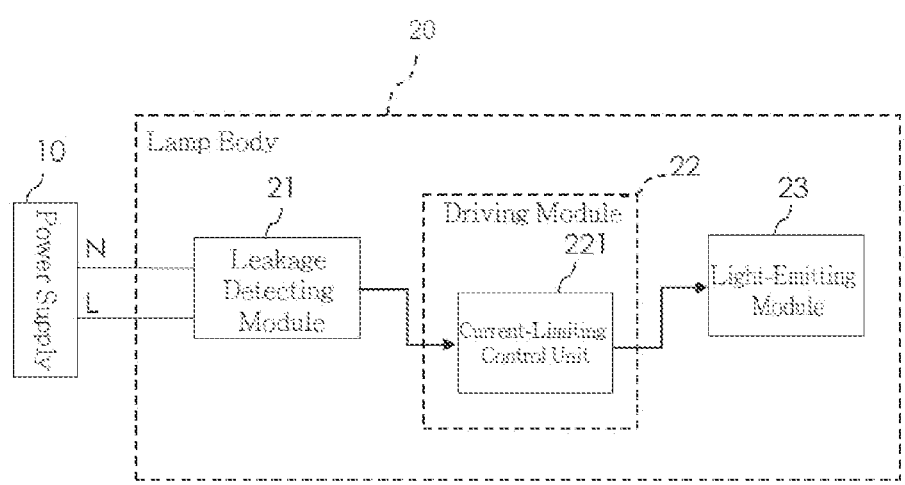
FIG. 1 is a block diagram of a lamp architecture of a preferred embodiment of the present invention.

For preferred embodiment of the present invention, please refer to FIG. 1, 2, it mainly discloses a lamp body (20) connected with an AC power supply (N, L) (10), and provides an electric leakage protection electronic rectifier in the lamp body (20). The electric leakage protection electronic rectifier converts the input AC current signal to DC output current/signal, and controllably limits the output current/signal.

The electric leakage protection electronic rectifier comprises a leakage detecting module (21), a driving module (22). The leakage detecting module (21) receives the power supply output current/signal, and detects whether there is a power leakage. The driving module (22) is electrically connected with the leakage detecting module (21), and based on the received output current/signal to drive a light-emitting module within the lamp body (20) for lighting. In this preferred embodiment of the invention, the light-emitting module is a LED module (23), makes the lamp body (20) for a LED lamp; The driving module (22) refers to a driving module with Type A+B driving circuit.

The driving module (22) is further provided with a current-limiting control unit (221), and the current-limiting control unit (221) is electrically connected with the leakage detecting module (21), and the current-limiting control unit (221) detects the output current of the power supply. When the output current of the power supply exceeding a reference signal, the output current of the power supply is limited in real time.

Figure 2:
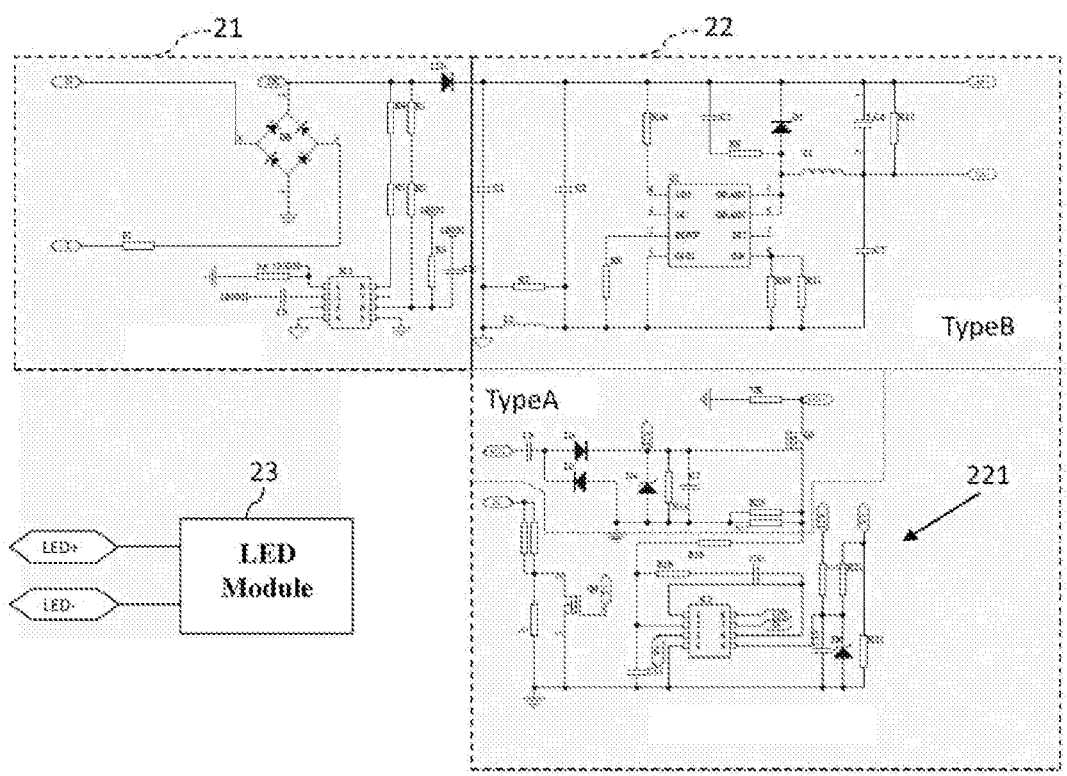
FIG. 2 is a circuit diagram of a lamp in a preferred embodiment of the invention.
Figure 3:
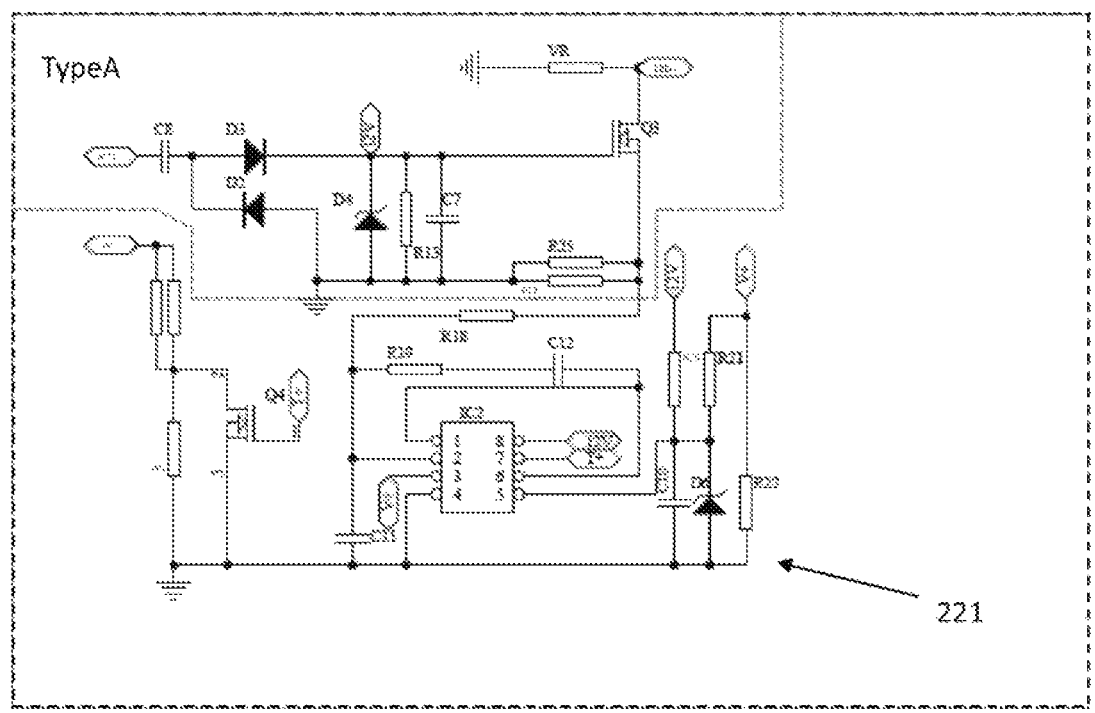
FIG. 3 is a circuit diagram of a driving module of a preferred embodiment of the invention.

As shown in FIGS. 2 and 3, the leakage detecting module (21) in this preferred embodiment includes a rectifier (DB) connected to the AC power supply (N,L) (10) to convert the AC input current into a DC output current.

As shown in FIG. 3, in the preferred embodiment of the invention, the current-limiting control unit (221) is arranged in the driving module (22) Type A circuit to limit a maximum current. Moreover, the current-limiting control unit (221) comprises a voltage input unit (R17, R25), a filter (R18, C11), a reference signal sampling circuit (R20, R21, R22, D6, C10), a comparator (IC2) and a switch unit (Q4). The comparator (IC2) has multiple pins (1~8). The pins (1~8) connects to the filter (R18, C11), the reference signal sampling circuit (R20, R21, R22, D6, C10, V+, 12V) and the switch unit (Q4).

In the preferred embodiment of the invention, the voltage input unit (R17, R25) is set in a power supply circuit of the driving module (22) Type A circuit, and connected with the filter (R18, C11). The voltage input unit (R17, R25) provides a voltage drop signal to the filter (R18, C11). The filter (R18, C11) filters the voltage drop signal and sends a filtered signal to pin (2), which is defined as a reverse input, of the comparator (IC2).

Meanwhile, the reference signal sampling circuit (R20, R21, R22, D6, C10, V+, 12V) provides a reference signal to pin (3) and pin (5), which are defined as noninverting inputs, of the comparator (IC2), to be as the reference signal of the current-limiting control unit (221).

In the preferred embodiment, when the comparator (IC2) receives the filtered signal from the filter (R18, C11) and the reference signal from the reference signal sampling circuit (R20, R21, R22, D6, C10, V+, 12 V). With such, the comparator (IC2) base on the filtered signal exceeding the reference signal, outputs a control signal (high voltage) from a control end (pin 7) thereof to the switch unit (Q4). In this preferred embodiment, the switch unit (Q4) comprises a MOS (Metal Oxide Semiconductor) switch (Q4).

Furthermore, in this preferred embodiment, the voltage input unit (R17,R25) comprises a first resistor (R17) and a second resistor (R25) connected in parallel. The filter (R18, C11) comprises a third resistor (R18) and a first capacitor (C11) connected in series, and the series of the third resistor (R18) and the first capacitor (C11) is connected to the pin (2) of the comparator (IC2);

The reference signal sampling circuit (R20, R21, R22, D6, C10) comprises a fourth resistor (R20), a fifth resistor (R21), a sixth resistor (R22), a diode (D6), and a second capacitor (C11), wherein the pin (5) of the comparator (IC2) is respectively connected with a connection portion of the fourth resistor (R20) and the second capacitor (C11) series, and with a connection portion of the fifth resistor (R21) and the diode (D6) series.

The pin (3) of the comparator (IC2) is connected with a connection portion of the fifth resistor (R21), the sixth resistor (R22). The MOS switch (Q4) is connected with the signal output end of the rectifier (DB) of the leakage detecting module (21).

Figure 4:
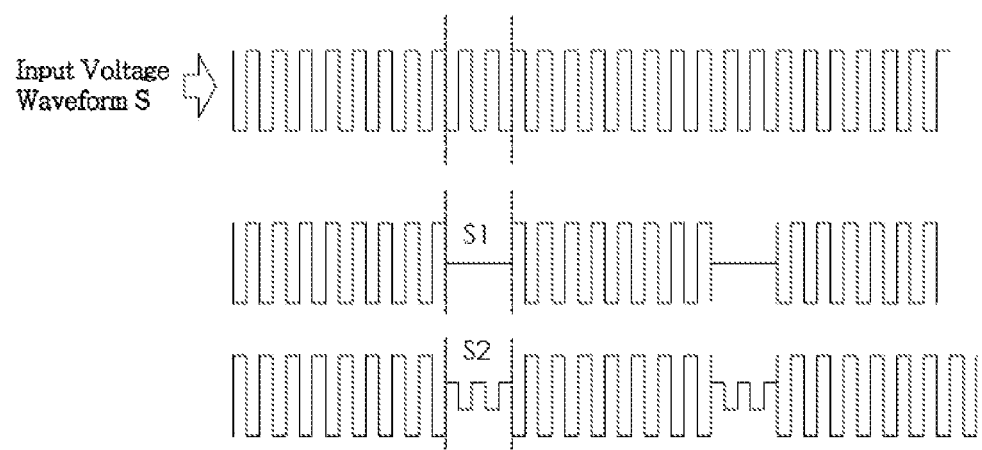
FIG. 4 is a schematic diagram of the application state of a restricted output current of a preferred embodiment of the invention.

As shown in FIG. 4, when the MOS switch (Q4) is on, the input voltage waveform S is cut down to the partial voltage S1 to limit the output current, or the input voltage waveform S is cut off to the partial voltage S2 to limit the output current. When the current-limiting control unit (221) continuously detects the output current of the power supply, and the output current of the power supply exceeding the reference signal, the current-limiting control unit 221 limits the output current of the power supply in real time, so as to avoid the current output exceeding the tolerable range of the lamp, prevents electricity leakage and prolongs the service life, thus increasing the security.

The above are only preferred embodiments of the present invention only, not limitation of the present invention in any form, although the invention has been disclosed above by the preferred embodiments, but not intended to limit the present invention, anyone familiar with Those skilled in the art, without departing from the scope of the technical solution of the present invention, when some minor modifications may be made using the techniques disclosed content equivalent embodiments or equivalent modifications to change, but all without departing from the technical content of the present invention, based on the technical spirit of the present invention, within the spirit and principle of the present invention, any simple modification of the above embodiment taken embodiment, equivalent replacements, improvements, etc., would fall within the scope of the technical solution of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electric leakage protection electronic rectifier comprising:
    a leakage detecting module connecting with a power supply; and
    a driving module comprising a Type A+B driving circuit and being electrically connected with the leakage detecting module, and having a current-limiting control unit being set in the Type A circuit of the driving module to limit the current and being electrically connected with the leakage detecting module;
    wherein the current-limiting control unit detects the output current of the power supply, when the current-limiting control unit detecting the output current of the power supply exceeding a reference signal, the current-limiting control unit limits the output current of the power supply.

2. The electric leakage protection electronic rectifier as claimed in claim 1, wherein the leakage detecting module includes a rectifier connected to a power supply.

3. The electric leakage protection electronic rectifier as claimed in claim 2, wherein the current-limiting control unit further includes a voltage input unit, a filter, a reference signal sampling circuit, a comparator and a switch unit, the comparator has many pins connecting with the filter, the reference signal sampling circuit and the switch unit.

4. The electric leakage protection electronic rectifier as claimed in claim 3, wherein
    the voltage input unit is connected with the filter and provides a voltage drop signal being filtered by the filter;
    the filter sends a filtered signal to the comparator; and
    the reference signal sampling circuit provides a reference signal to the comparator as the reference signal of the current-limiting control unit.

5. The electric leakage protection electronic rectifier as claimed in claim 4, wherein when the comparator receives the filtered signal from the filter and the reference signal from the reference signal sampling circuit, the comparator outputs a control signal to the switch unit according to the filtered signal exceeding the reference signal;
    when the switch unit is controlled, a waveform of the input voltage is lowered or partially cut off, so as to limit an output current.

6. The electric leakage protection electronic rectifier as claimed in claim 5, wherein the switch unit comprises a MOS switch connected to the rectifier of the leakage detecting module.

7. The electric leakage protection electronic rectifier as claimed in claim 6, wherein:
    the voltage input unit comprises a first resistor and a second resistor connected together;
    the filter comprises a third resistor and a first capacitor being connected together in series, and a connection portion of the third resistor and the first capacitor is connected with the comparator;
    the reference signal sampling circuit comprises a fourth resistor, a fifth resistor and a sixth resistor, a diode and a second capacitor;
    wherein the comparator is respectively connected with a connection portion of the fourth resistor and the second capacitor, and a connection portion of the fifth resistor and the diode; and
    the comparator is connected with a connection portion of the fifth resistor and the sixth resistor.

8. A lamp comprising:
    a body connecting with a power supply;
    a leakage detecting module arranged in the body and connected with the power supply;
    a light emitting module being arranged in the body;
    a driving module comprising a Type A+B driving circuit and being electrically connected with the leakage detecting module, and having a current-limiting control unit being set in the Type A circuit of the driving module to limit the current and being electrically connected with the leakage detecting module;
    wherein the current-limiting control unit detects the output current of the power supply, when the current-limiting control unit detecting the output current of the power supply exceeding a reference signal, the current-limiting control unit limits the output current of the power supply.

9. The lamp as claimed in claim 8, wherein the light-emitting module is an LED light emitting module.

\* \* \* \* \*